Figure 1:
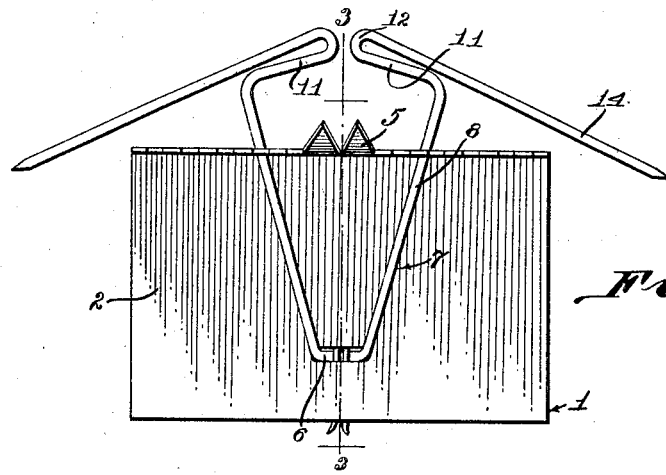

April 1, 1924.

W. R. BARGER

WEANER

Filed June 1, 1922

1,488,776

W. R. Barger,
Inventor

By C. A. Snow & Co.
Attorney

Patented Apr. 1, 1924.

1,488,776

UNITED STATES PATENT OFFICE.

WALTER R. BARGER, OF BENKELMAN, NEBRASKA.

WEANER.

Application filed June 1, 1922. Serial No. 565,057.

*To all whom it may concern:*

Be it known that I, WALTER R. BARGER, a citizen of the United States, residing at Benkelman, in the county of Dundy and State of Nebraska, have invented a new and useful Weaner, of which the following is a specification.

The device forming the subject matter of this application is a weaner and the invention aims to provide novel means whereby the suspension member of the weaner may be mounted on the nose of the animal, and to provide the suspension member with prongs which are so constructed that they will serve to deflect away any object which may strike the weaner, thereby preventing the weaner from being torn off the nose of the animal.

In the drawings:—

Figure 2:
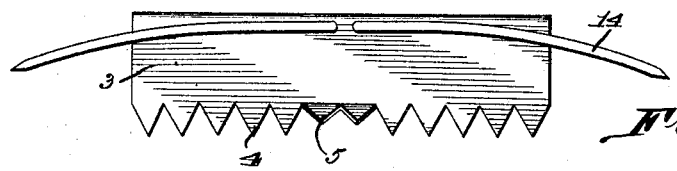
Figure 4:
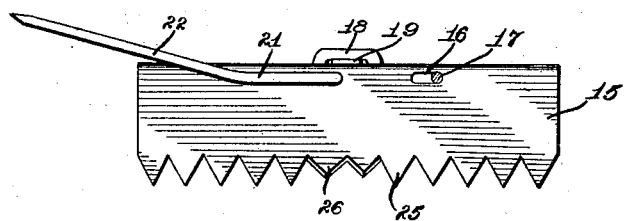
Figure 3:
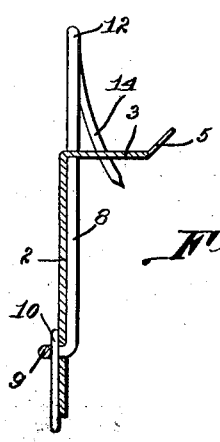

Figure 1 is an elevation; Figure 2 is a top plan; Figure 3 is a section on the line 3—3 of Figure 1; Figure 4 is a plan showing a modification, parts being broken away.

The weaner comprises a body 1 including a plate-like main member 2 provided along one edge with a projecting flange 3 having teeth 4 disposed in alinement with the flange, and other teeth 5 which are disposed at an obtuse angle to the flange. There is an opening 6 in the main member 2. A suspension device 7 is provided and includes diverging arms 8 which are slidable through the flange 3, the arms being connected by a rectangularly disposed U-shaped foot 9 extended through the opening 6 and adapted to receive a cotter pin 10 or the like. The arms 8 are provided with inwardly extended fingers 11 merging into bends 12, forming a nose grip, the bends being extended to form prongs 14 which are inclined, as shown in Figure 1, parallel to the main member 2, and are inclined, as shown in Figure 2, at an angle to the member 2, this double inclination enabling the prongs to deflect away, any object against which they may be struck. The weaner, therefore, is not likely to be torn off the nose of the animal when the prongs 14 come into contact with a fence post, a fence wire or other object.

The general operation of a device of this kind is known, but it may be stated that the securing element 10 may be detached from the foot 9, the foot 9 being removed from the opening 6, whereupon the arms 8 may be slid upwardly in the flange 3, the bends 12 of the nose grip being separated. When the parts are restored to the position shown in Figures 1 and 3, the grips 12 will serve to retain the device on the nose of the animal. The prongs 14, projecting beyond the vertical edges of the member 2, aid in rendering the device effective.

In the form shown in Figure 4, the flange appears at 15 and the openings for the arms 17 are shown at 16, the foot, corresponding to the part 9 being marked by the numeral 18, and the securing element or cotter pin being designated at 19. The nose grip or bend is marked by the numeral 20, and the prong is shown at 21. The prong 21 has a somewhat pronounced rearward inclination, as indicated at 22, instead of the more moderate forward inclination depicted in Figure 2. The form disclosed in Figure 4 is of peculiar utility for use on a cow which attempts to drain herself. The prong of Figure 4 has its advantages as a deflecting means, as hereinbefore pointed out in connection with the prong 14. The teeth 25 and 26 are constructed like the teeth 4 and 5.

What is claimed is:

In a device of the class described, a body comprising a main member having a flange, a suspension device embodying arms slidable in the flange, the arms having inwardly extended loop-shaped fingers constituting nose grips, the grips being extended to form oppositely projecting prongs which are inclined downwardly in a direction parallel to the main member and are inclined laterally, in a direction substantially at right angles to the flange, and means for assembling the suspension device detachably with the main member of the body.

In testimony that I claim the foregoing as my own, I have hereto affixed my signature in the presence of two witnesses.

WALTER R. BARGER.

Witnesses:
H. G. MATTESON,
JOHN WYCKOFF.